(12) United States Patent
Lamb

(10) Patent No.: US 8,070,144 B2
(45) Date of Patent: Dec. 6, 2011

(54) ASSEMBLY GUIDE FOR VEHICLE SPRING AND METHOD

(75) Inventor: Julian Lamb, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/847,597

(22) Filed: Aug. 30, 2007

(65) Prior Publication Data

US 2008/0054536 A1    Mar. 6, 2008

Related U.S. Application Data

(60) Provisional application No. 60/824,139, filed on Aug. 31, 2006.

(51) Int. Cl.
*B60G 15/00* (2006.01)

(52) U.S. Cl. ........................................... 267/220

(58) Field of Classification Search .... 267/64.21–64.27, 267/220, 221; 280/124.147, 124.155
See application file for complete search history.

(56) References Cited

U.S. PATENT DOCUMENTS

| | | | |
|---|---|---|---|
| 4,042,259 A | 8/1977 | Fiedler et al. | |
| 4,434,977 A | 3/1984 | Chiba et al. | |
| 4,486,028 A | 12/1984 | Tanahashi | |
| 4,852,861 A * | 8/1989 | Harris | 267/64.27 |
| 5,326,082 A * | 7/1994 | Ecktman et al. | 267/64.27 |
| 5,342,139 A * | 8/1994 | Hoffman | 403/327 |
| 5,467,970 A * | 11/1995 | Ratu et al. | 267/220 |
| 5,467,971 A * | 11/1995 | Hurtubise et al. | 267/220 |
| 5,676,355 A | 10/1997 | Hayashi et al. | |
| 5,775,720 A | 7/1998 | Kmiec et al. | |
| 6,007,061 A | 12/1999 | Kammel et al. | |
| 6,179,309 B1 | 1/2001 | Satou et al. | |
| 6,659,411 B2 * | 12/2003 | Araki | 248/188.8 |
| 6,749,047 B2 | 6/2004 | Koyano et al. | |
| 6,913,253 B2 | 7/2005 | Mennesson | |
| 6,948,728 B2 | 9/2005 | Pflugner | |
| 7,338,040 B2 * | 3/2008 | Schleck et al. | 267/220 |

FOREIGN PATENT DOCUMENTS

JP    5215165    8/1993

* cited by examiner

*Primary Examiner* — Christopher Schwartz
(74) *Attorney, Agent, or Firm* — Kenealy Vaidya LLP; Mark E. Duell

(57) ABSTRACT

A vehicle spring guide assembly is shown for mounting a coil spring to a suspension component of a vehicle. The assembly can include a vehicle mounting member and a spring guide member. The vehicle mounting member includes a bumper portion and a mounting interface portion. The mounting interface portion can be configured to engage the bumper portion and fixedly mount the bumper portion to a suspension component of a vehicle. The spring guide member can include an annular portion configured to engage with one end of a coil spring and a flexible frustoconical portion configured to extend within the inside diameter of the coil spring. The flexible frustoconical portion can be detachably engaged with the mounting interface portion of the vehicle mounting member, and can be configured to guide and isolate the coil spring during assembly.

11 Claims, 5 Drawing Sheets

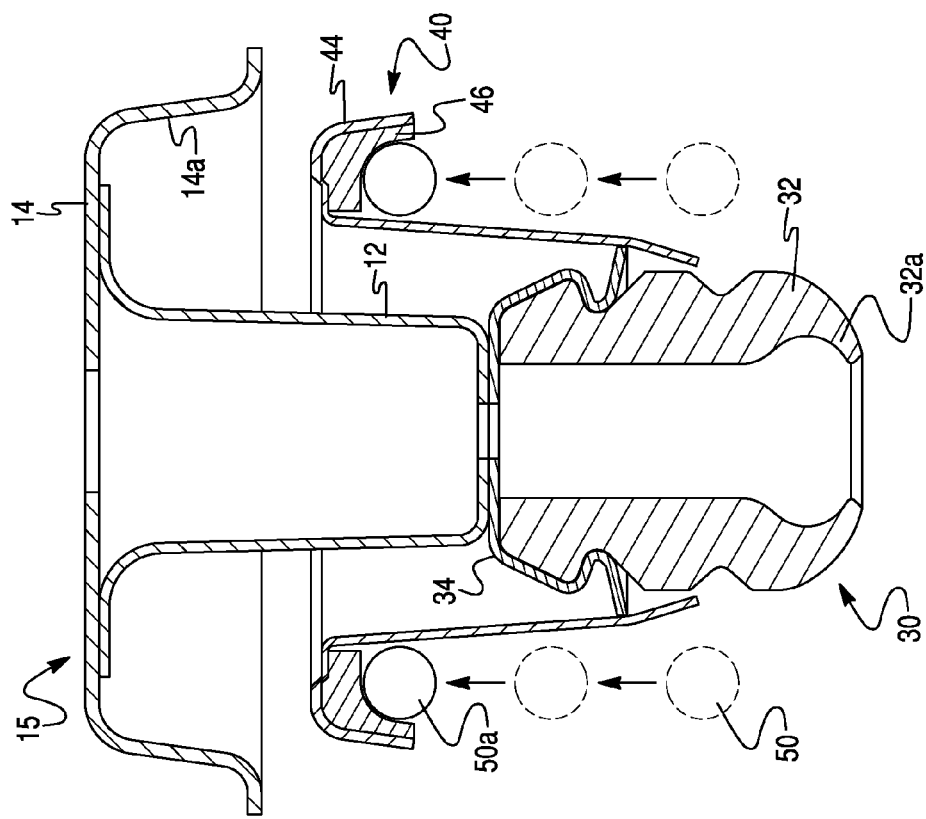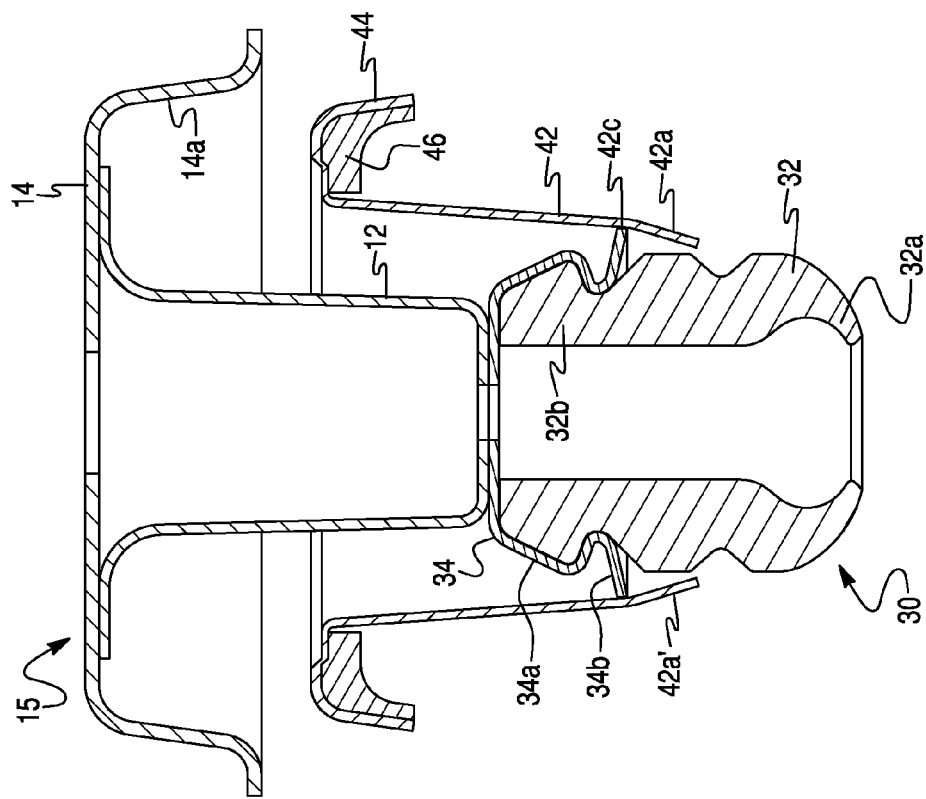

ASSEMBLY GUIDE FOR VEHICLE SPRING AND METHOD

This application claims the priority benefit under 35 U.S.C. §119 of U.S. Provisional Patent Application No. 60/824,139 filed on Aug. 31, 2006, which is hereby incorporated in its entirety by reference.

BACKGROUND

1. Field

The disclosed subject matter relates to suspension system components for motor vehicles.

2. Brief Description of the Related Art

Suspension systems for vehicles can be interposed between a vehicle wheel and the body of the vehicle to dampen vibrations that are transmitted from the wheel to the vehicle body. The suspension systems can include a shock absorber, and a coil spring disposed around at least a portion of the shock absorber. The shock absorber typically includes a cylindrical member and a piston rod disposed to slide in and out of the cylindrical member. The cylindrical member can be connected either directly or indirectly to a wheel of the vehicle. The piston rod is typically disposed so as to advance and retract with respect to the cylindrical member, and can be connected either directly or indirectly to a portion of the vehicle body.

The coil spring is usually disposed outside the shock absorber by a predetermined space. One of the opposite ends of the coil spring can be held on a first seat, which can be connected to the cylindrical member. The opposite end of the coil spring can be held on a second seat, which can be connected to the piston rod. Additional suspension system components can include a shock-absorbing bumper member mounted inside of the coil spring and provided with a central, axially extending hole through which the piston rod can be extended. The bumper member can be disposed to limit the travel of the cylindrical member relative to the piston rod.

Installation of the coil spring over the cylindrical member, piston rod and bumper member during assembly or repair of the suspension components often requires the use of an elaborate installation jig to avoid contact between the coil spring and any metal or other portions of the suspension components that may be damaged by such contact.

Potential problems associated with known methods of assembling the suspension components and installing the coil spring can include the expense and complexity of required installation jigs such as described above, increased assembly and repair times that may result, and limitations on the possible configurations of the suspension system components to allow for the placement and use of such installation jigs. In addition, conventional jigs sometimes do not provide an adequate amount of protection, resulting in damage to vehicle components during assembly of the suspension components.

SUMMARY

According to one aspect of the disclosed subject matter, a vehicle spring guide assembly can be adapted for mounting a coil spring to a suspension component of a vehicle. The vehicle spring guide assembly can eliminate the need for a separate jig to install a coil spring by providing a vehicle mounting member and a spring guide member as components of the assembly. The vehicle mounting member can include a bumper portion and a mounting interface portion, with the bumper portion including a shock absorbing member, and the mounting interface portion being configured to engage the bumper portion and fixedly mount the bumper portion to a suspension component of a vehicle. The mounting interface portion can include an annular flange that includes a radially inward extending lip and a radially outward extending lip. The radially inward extending lip can be configured to engage with an annular recess around the outer periphery of the bumper portion, and the radially outward extending lip can be configured to engage with the spring guide member.

The spring guide member can include a concave annular portion configured to capture an annular seating member for engagement with one end of a coil spring, and a flexible frustoconical portion configured to extend within the inside diameter of the coil spring. The flexible frustoconical portion can be detachably engaged with the mounting interface portion of the vehicle mounting member.

In accordance with another aspect of the disclosed subject matter, the flexible frustoconical portion of the spring guide member can include a plurality of fingers that extend from the annular portion and that are radially flexed by contact with the outward extending lip on the annular flange of the mounting interface portion.

In accordance with yet another aspect of the disclosed subject matter, the vehicle mounting member can provide a means for fixedly mounting a shock absorbing member to a suspension component of the vehicle, and a means for detachably mounting a spring guide member to be used for guiding a coil spring into a final operative position on the vehicle suspension component.

Still other objects, features, and attendant advantages will become apparent to those skilled in the art from a reading of the following detailed description of embodiments constructed in accordance therewith, and taken in conjunction with the accompanying drawings.

BRIEF DESCRIPTION OF THE DRAWINGS

A more complete appreciation of the disclosed subject matter and many of its features and characteristics will be apparent with reference to the following detailed description in connection with the accompanying drawings, all of which form a part of the disclosure, and in which:

FIG. 3 is an elevation view of the vehicle spring assembly guide shown in FIG. 1 joined to a portion of a vehicle body member;

FIG. 4 is an elevation view of the assembly shown in FIG. 3 with a coil spring in position to be guided by the assembly into its permanent position on the vehicle.

DETAILED DESCRIPTION OF EXEMPLARY EMBODIMENTS

Figure 1:
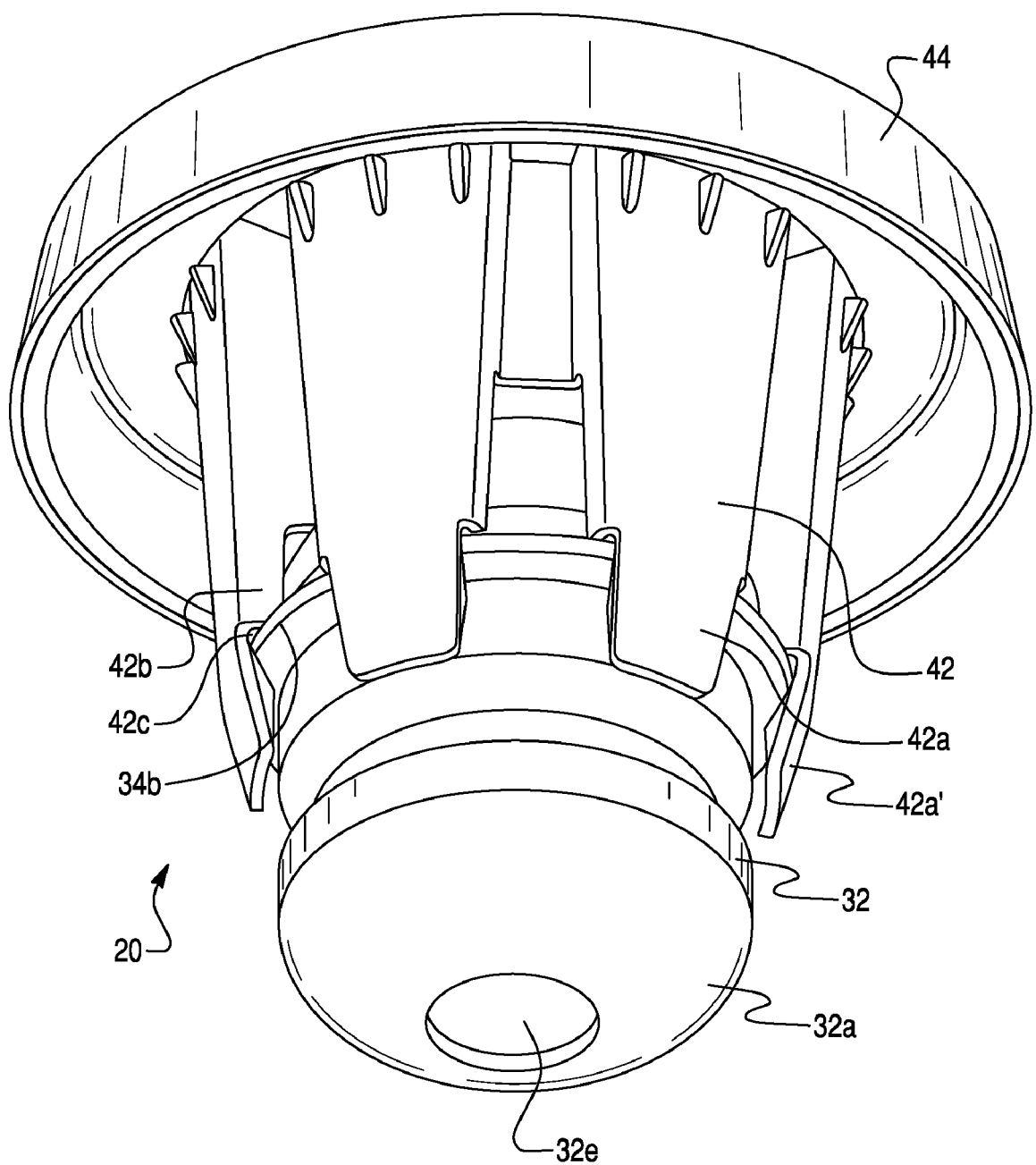
FIG. 1 is a perspective view of an embodiment of a vehicle spring assembly guide made in accordance with principles of the disclosed subject matter.

Referring to the drawing figures, like reference numerals designate identical or corresponding elements throughout the several figures.

Figure 1A:
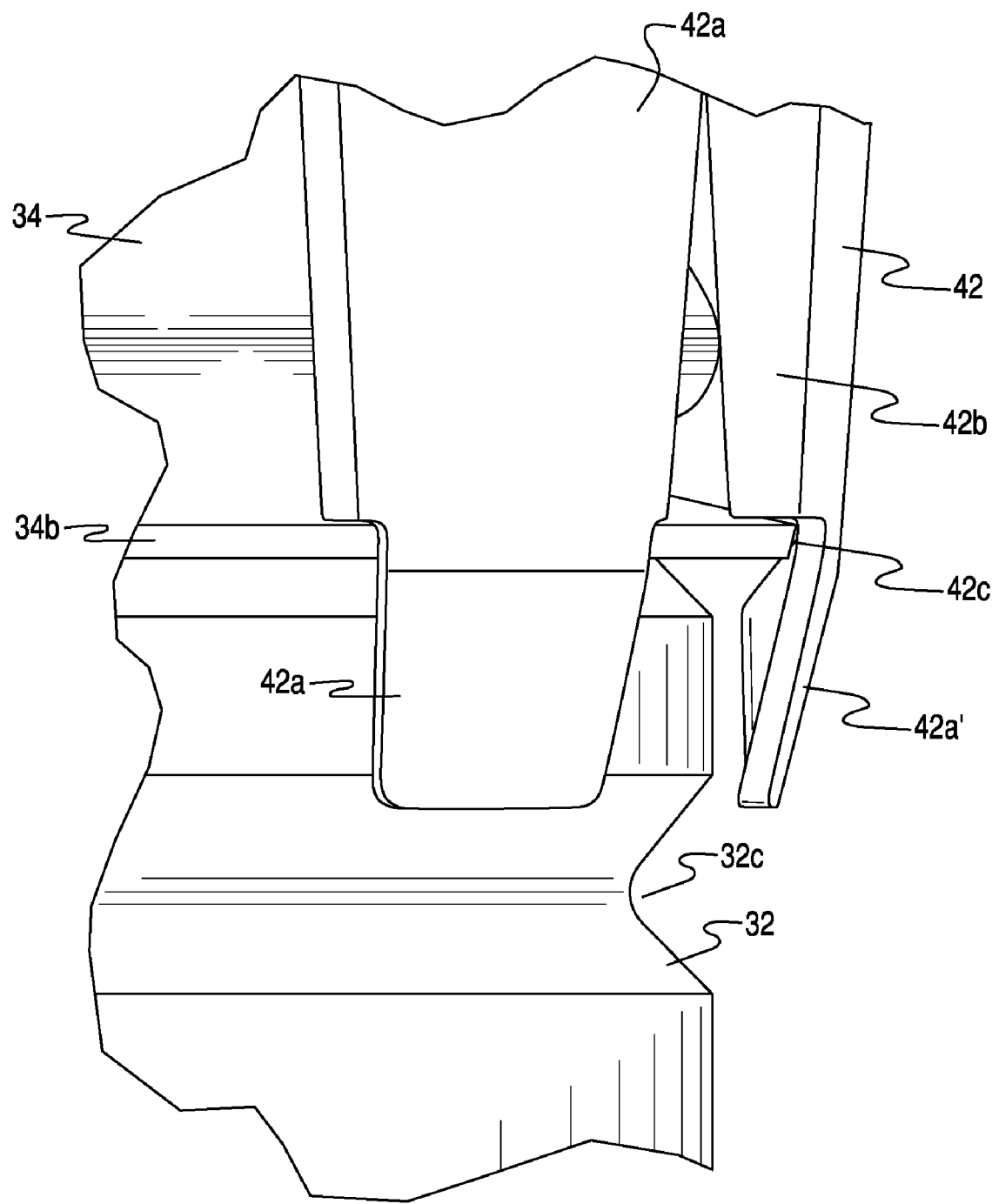
FIG. 1A is an enlarged partial perspective view of the embodiment shown in FIG. 1.

FIGS. 1 and 1A show perspective views of a vehicle spring guide assembly 20 according to one embodiment. As further shown in FIG. 2, the vehicle spring guide assembly 20 can include a vehicle mounting member 30 and a spring guide member 40.

The vehicle mounting member 30 can include a bumper portion 32 and a mounting interface portion 34. The bumper portion 32 can include a shock absorbing member such as a rubber stopper designed to absorb shock loads that may be transmitted from a piston and cylinder of a shock absorber (not shown) connected between a wheel of the vehicle and the vehicle body. The piston rod (not shown) of such a shock absorber can pass through a central axial opening 32e extending from one end 32a to the opposite end 32b of bumper portion 32. The bumper portion 32 can be configured to stop travel of the piston rod relative to the cylinder before bottoming out during a severe shock load transmitted from the wheel to the vehicle body.

Figure 2:
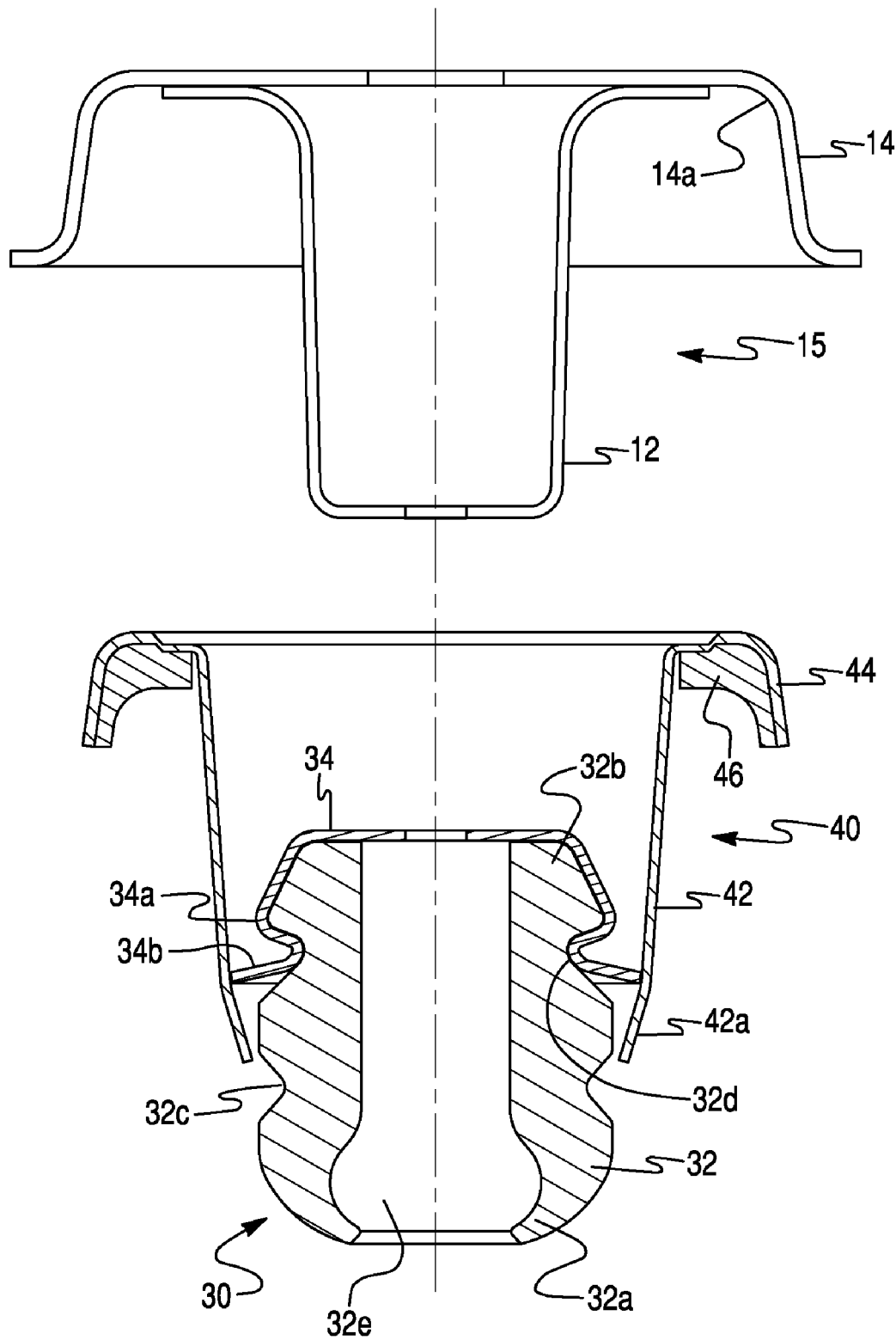
FIG. 2 is an elevation view of the vehicle spring assembly guide shown in FIG. 1, in position to be joined with a portion of a vehicle body member.

The mounting interface portion 34 of the vehicle mounting member 30 can include a cup-shaped metal component 34a configured to capture the bumper portion 32 at least at one axial end 32b of the bumper portion 32, as shown in FIG. 2. The bumper portion 32 can be configured to include one or more annular recesses 32c, 32d extending around the outer periphery of the bumper portion 32. The bumper portion 32 can include a rubber part molded to include the annular recesses 32c, 32d. The mounting interface portion 34 can include a flange portion 34b, shown in FIG. 2, wherein the flange portion 34b can be configured with a radially inward extending portion that engages with annular recess 32d of bumper portion 32, thereby capturing the bumper portion 32 at end 32b of the bumper portion 32, and a radially outward extending portion that forms an annular lip around the vehicle mounting member 30.

As shown in FIG. 2, the spring guide member 40 can include a concave annular portion 44 at one axial end of the spring guide member 40 and a flexible frustoconical portion 42 extending from the annular portion 44. The concave annular portion 44 can include an annular elastomeric seating portion 46 captured by the concave annular portion 44 and configured to receive one end of a coil spring. The flexible frustoconical portion 42 can include a plurality of fingers 42a extending from the annular portion 44 of the spring guide member 40, with distal ends 42a' of each of the plurality of fingers 42a configured to be radially flexed against the radially outward extending portion of annular flange 34b of mounting interface portion 34.

The spring guide member 40 can be made from a flexible plastic or metal material, or other resilient material, such that the spring guide member 40 can be detachably retained in place relative to the vehicle mounting member 30 as a result of the distal ends 42a' of fingers 42a being flexed radially outward by annular flange 34b of mounting interface portion 34. Each of the distal ends 42a' of fingers 42a can be configured to angle radially inward from thicker, proximal portions 42b of the fingers such that the intersection of each of the distal ends 42a' with the thicker, proximal portions 42b of each finger form a detent 42c, shown in FIG. 1A, which detachably engages with the outwardly extending portion of annular flange 34b.

The spring guide member 40 can be installed onto vehicle mounting member 30 before, during or after installation of the vehicle mounting member 30 to a suspension component 15 mounted on the vehicle. The vehicle mounting member 30 can be bolted or otherwise connected to the suspension component 15 by joining mounting interface portion 34 to axially extending abutment 12 of the suspension component 15, as shown in FIG. 3. The mounting interface portion 34 can be joined to the abutment 12 by bolting, welding, soldering, brazing, or other well known joining methods. The spring guide member 40 can be installed around the mounting interface portion 34 by assembling the annular portion 44 at one axial end of spring guide member 40 over the bumper portion 32 of vehicle mounting member 30 and past the outwardly extending portion of annular flange 34b until the inside surfaces of the fingers 42a contact the annular flange 34b. The fingers 42a are flexed radially outward as the spring guide member 40 is moved axially relative to the vehicle mounting member 30. The spring guide member 40 is moved axially relative to the vehicle mounting member 30 until the detents 42c formed by the intersection of the thicker proximal portion 42b of each finger 42a and the thinner, radially inwardly tapered distal ends 42a' of each finger 42a engage with the outwardly extending portion of annular flange 34b. The resilience of the fingers 42a of flexible frustoconical portion 42 retains the spring guide member 40 in place relative to the vehicle mounting member 30.

Figure 5:
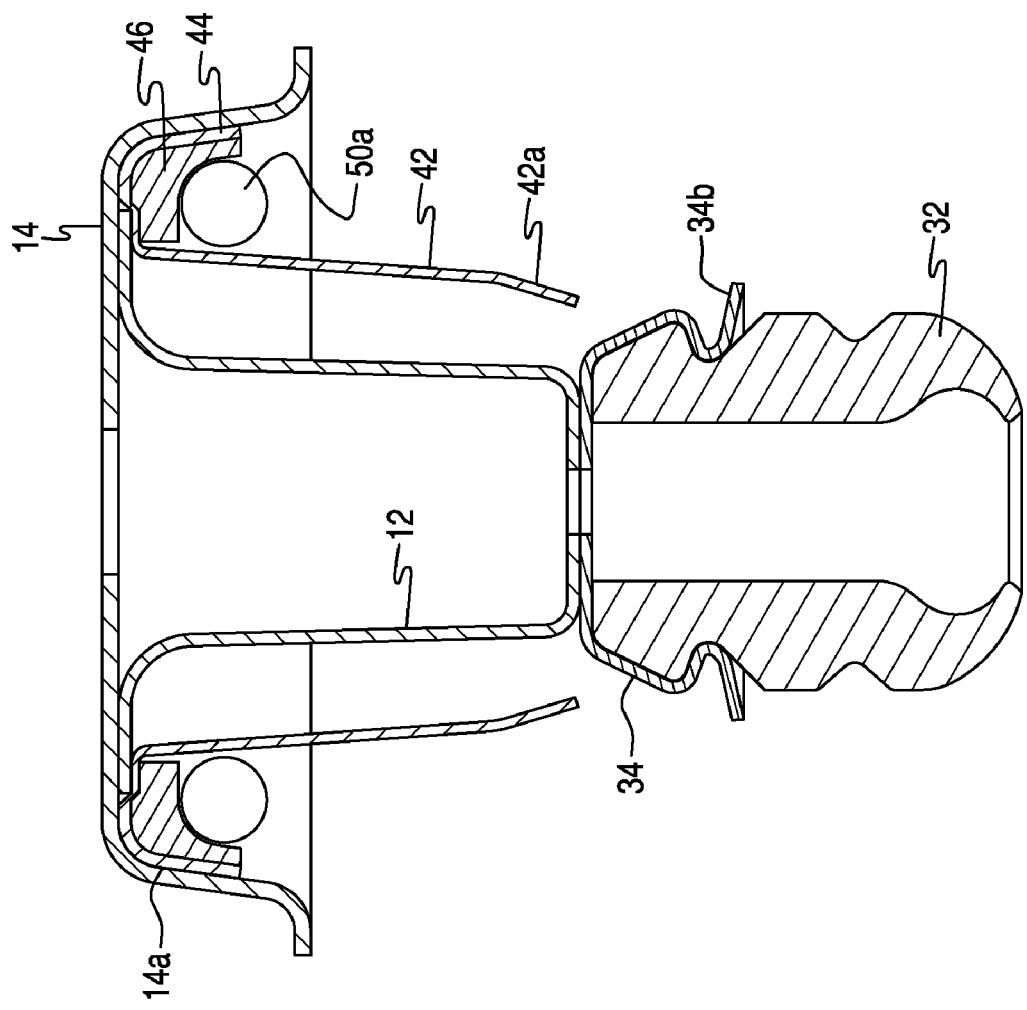
FIG. 5 is an elevation view of the assembly shown in FIG. 4 with the coil spring and associated spring guide portion in their final configuration according to one aspect of the disclosed subject matter.

Installation of a coil spring 50 to the suspension component 15, as shown in FIGS. 4 and 5, can be achieved without contacting other portions of the suspensions system, such as the outwardly extending portion of annular flange 34b, as a result of the protection provided by the spring guide member 40. The coil spring 50 can be installed over the vehicle mounting member 30 until end 50a of the coil spring 50 seats against elastomeric seating portion 46 at annular portion 44 of the spring guide member 40. The plastic fingers 42a of frustoconical portion 42 extend axially within the coil spring 50 and separate the coil spring from the outwardly extending portion of annular flange 34b. Continued exertion of an axial force against coil spring 50 in the direction toward suspension component 15 creates a counteracting outward radial force from annular flange 34b against the distal ends 42a' of fingers 42a such that the fingers 42a flex radially outward until the detents 42c move past the annular flange 34b. The spring guide 40 is moved past the flange 34b, and the end 50a of coil spring 50 seated in elastomeric seating portion 46 and annular portion 44 are seated against a mating concave surface 14 of the suspension component 15, as shown in FIG. 5.

While certain embodiments of the disclosed subject matter are described above, it should be understood that the disclosed subject matter can be embodied and configured in many different ways without departing from the spirit and scope of the invention. For example, the fingers 42a of the frustoconical portion 42 can include a resilient metal material coated with a protective coating that will not be marred by the coil spring, and that will still prevent the coil spring from contacting other metallic components such as the annular flange 34b. Other configurations of the spring guide 40 and the vehicle mounting member 30 can also be provided that will allow the spring guide to be detachably mounted to the vehicle mounting member, and that will result in the interposition of the spring guide between the coil spring and the vehicle mounting member to act both as a guide for the coil spring during assembly and as a buffer between the coil spring and any components that may be damaged by contact with the coil spring.

It is also contemplated that the fingers of the spring guide member be non-symmetric and/or differently shaped depending on the shape of the bumper portion and/or mounting interface portion of the vehicle mounting member. In addition, the fingers can be provided with structures other than the above described detents for providing a more positive lock with the mounting interface portion. For example, the fingers can be straight with a bump or other locking structure provided on an interior side of the finger for providing a solid locking relationship with the mounting interface portion. Alternatively, the fingers can be shaped as straight pieces with no significant locking structure provided on the fingers other then the resiliency of the fingers themselves. The fingers could also be slightly bent at a portion that is intended to mate with the mounting interface portion.

The specific shape of the mounting interface portion can vary widely while remaining within the spirit and scope of the disclosed subject matter. In particular, the mounting interface portion can include a locking structure that provides a more positive locking relationship between it and the fingers of the spring guide member. The mounting interface portion need not have the annular recess portions or the annular extension. For example, of the bumper is a smooth cylindrical shape, the mounting interface portion can likewise be formed in a smooth cylindrical shape. Alternatively, the bumper and mounting interface portion can include a complex non-symmetrical shape, depending on the particular vehicle application and particular intended use of the suspension system.

As indicated above, the mounting interface portion of the vehicle mounting member can include an annular portion that extends and is in frictional contact with an inner periphery of the fingers of the spring guide member. It should be noted that the annular portion can extend from a location that is above, below, or coincident with the bumper portion of the vehicle mounting member. In other words, the bumper portion can be located above or below the sliding contact location between the spring guide member and the vehicle mounting member. In addition, the bumper portion can be more complex than that shown in the exemplary drawings. For example, the bumper itself can include a piston/cylinder arrangement, or can include a pneumatic or liquid shack absorbing structure.

The spring guide member, the vehicle mounting member, or both, can include means for sliding with respect to each other. For example, the fingers acting in conjunction with the mounting interface portion can act as means for sliding. In addition, while the means for mounting the vehicle spring guide assembly is generally described as the vehicle mounting member 30 above, the means can include or exclude various structures associated with the above described vehicle mounting member 30. Likewise, the means for positioning and guiding a coil spring is generally described as the spring guide member 40 above. However, these means can also include or exclude various structures associated with the above described spring guide member 40.

The method of assembly can take place before, during or after the suspension system is mounted in a vehicle. The specific order of assembly of the spring and vehicle mounting member can also be varied for the convenience of the application or operator preference.

While the invention has been described in detail with reference to exemplary embodiments thereof, it will be apparent to one skilled in the art that various changes can be made, and equivalents employed, without departing from the scope of the invention.

What is claimed is:

1. A method for installing a coil spring to a suspension component of a vehicle, the method comprising:
   providing a shock absorbing member adapted to absorb shock loads transmitted from suspension components on the vehicle;
   providing a mounting interface member configured to engage the shock absorbing member and to fixedly mount the shock absorbing member to the suspension component of the vehicle;
   providing a spring guide including a seating portion configured to mate with one end of a coil spring and flexible fingers extending from the seating portion, the flexible fingers being configured to guide a coil spring during installation of the coil spring onto the vehicle;
   fixedly mounting the mounting interface member and the shock absorbing member to the vehicle; and
   detachably mounting the spring guide to the mounting interface member by engaging the flexible fingers with the mounting interface member.

2. The method of claim 1, further including:
   installing a coil spring over the spring guide with the spring guide detachably mounted on the mounting interface member and the flexible fingers of the spring guide separating the coil spring from the mounting interface member; and
   moving the coil spring in an axial direction against the seating portion of the spring guide.

3. The method of claim 2, further including:
   pressing the coil spring in an axial direction against the seating portion of the spring guide until the flexible fingers of the spring guide are flexed radially outward to clear a lip portion of the mounting interface member.

4. The method of claim 3, further including:
   moving the coil spring seated against the seating portion of the spring guide and the spring guide in an axial direction into a final assembled position on a component of the vehicle with the coil spring maintained in a spaced relationship with the mounting interface member by the flexible fingers of the spring guide.

5. The method of claim 1, wherein the mounting interface member includes an annular flange that engages with the shock absorbing member and that includes a radially outward extending lip, the method including:
   installing the spring guide over the mounting interface member until the flexible fingers are flexed radially outward by contact between the radially outward extending lip of the mounting interface member and inner surfaces of the flexible fingers.

6. A vehicle spring guide assembly adapted for installing a coil spring to a suspension component of a vehicle, the vehicle spring guide assembly comprising:
   means for mounting the vehicle spring guide assembly to the vehicle; and
   means for positioning and guiding a coil spring during installation of the coil spring to a suspension component of the vehicle, wherein
   the means for mounting the vehicle spring guide assembly includes means for sliding with respect to the means for positioning and guiding a coil such that during installation of the coil the means for positioning and guiding a coil slides with respect to the means for mounting the vehicle spring, and
   the means for positioning and guiding a coil spring includes resilient engagement fingers for detachably mounting the means for positioning and guiding a coil spring to the means for mounting the vehicle spring guide assembly to the vehicle.

7. The vehicle spring guide assembly in accordance with claim 6, wherein the means for mounting the vehicle spring guide assembly to the vehicle includes a central axial opening for clearance around a piston of a shock absorbing member of the vehicle.

8. The vehicle spring guide assembly in accordance with claim 6, wherein the means for positioning and guiding a coil spring includes a frustoconical portion configured to extend at least partially within an inner diameter of a coil spring to separate the coil spring from the means for mounting the vehicle spring guide assembly to the vehicle.

9. The vehicle spring guide assembly in accordance with claim 6, wherein the means for positioning and guiding a coil spring includes a plastic material.

10. The vehicle spring guide assembly in accordance with claim 6, wherein the means for mounting the vehicle spring guide assembly to the vehicle includes a resilient shock absorbing device.

11. A vehicle spring guide assembly adapted for installing a coil spring to a suspension component of a vehicle, the vehicle spring guide assembly comprising:
   means for mounting the vehicle spring guide assembly to the vehicle; and
   means for positioning and guiding a coil spring during installation of the coil spring to a suspension component of the vehicle, wherein
   the means for mounting the vehicle spring guide assembly includes means for sliding with respect to the means for positioning and guiding a coil such that during installation of the coil the means for positioning and guiding a coil slides with respect to the means for mounting the vehicle spring, and
   the means for positioning and guiding a coil spring includes an annular seating portion for receiving one end of a coil spring and flexible engagement fingers extending from the annular seating portion for detachably positioning the means for positioning and guiding a coil spring adjacent the means for mounting the vehicle spring guide assembly to the vehicle.

* * * * *